United States Patent [19]

Vassiliou

[11] 4,049,863
[45] Sept. 20, 1977

[54] FLUOROPOLYMER PRIMER HAVING IMPROVED SCRATCH RESISTANCE

[75] Inventor: Eustathios Vassiliou, Newark, Del.

[73] Assignee: E. I. Du Pont de Nemours and Company, Wilmington, Del.

[21] Appl. No.: 701,745

[22] Filed: June 30, 1976

Related U.S. Application Data

[63] Continuation-in-part of Ser. No. 600,577, July 31, 1975, abandoned.

[51] Int. Cl.² .................. B32B 27/00; C08G 51/24; C08J 1/48
[52] U.S. Cl. .................. 428/324; 106/83; 106/84; 427/388 R; 427/409; 260/29.2 N; 260/29.6 F; 260/857 L; 260/857 UN; 428/327; 428/328; 428/331; 428/404; 428/422; 428/435; 428/458; 428/539
[58] Field of Search .............. 428/422, 327, 331, 435, 428/458, 324, 328, 404, 539; 260/29.6 F, 857 L, 857 UN, 29.2 N; 106/74, 83, 84; 427/388 R, 409

[56] References Cited

U.S. PATENT DOCUMENTS

| | | | |
|---|---|---|---|
| 2,961,341 | 11/1960 | Long | 428/422 |
| 2,979,418 | 11/1961 | Dipner | 428/422 |
| 3,087,827 | 4/1963 | Klenke | 106/291 |
| 3,087,828 | 4/1963 | Linton | 106/296 |
| 3,087,829 | 4/1963 | Linton | 106/291 |
| 3,655,604 | 4/1972 | Strolle | 260/29.6 F |
| 3,661,831 | 5/1972 | Fang | 260/32.8 A |
| 3,663,728 | 5/1972 | Hoback | 260/29.2 N |
| 3,694,392 | 9/1972 | Werner | 260/29.6 F |
| 3,787,338 | 1/1974 | Skelly | 260/29.6 F |

*Primary Examiner*—Ellis Robinson

[57] ABSTRACT

Compositions containing
   a. fluoropolymer,
   b. colloidal silica,
   c. the salt of a polyamide acid,
   d. a coalescing agent,
   e. mica particles, mica particles coated with pigment, or metal flake,
and
   f. a liquid carrier
are useful for priming metal, especially cookware, before topcoating it with a fluoropolymer enamel.

23 Claims, No Drawings

FLUOROPOLYMER PRIMER HAVING IMPROVED SCRATCH RESISTANCE

CROSS-REFERENCE TO RELATED APPLICATIONS

This application is a continuation-in-part of application Ser. No. 600,577 now abandoned, filed July 31, 1975.

BACKGROUND OF THE INVENTION

Cookware coated with fluoropolymers, especially polytetrafluoroethylene (PTFE), has come into widespread use in recent years. Many cooks prefer to use such cookware because of its non-stick properties and because it is so easy to clean.

It is well known that the adhesion of fluoropolymers to metal is of a rather low order, so in the fabrication of such cookware it is customary to improve adhesion by applying a primer composition to the metal before applying the fluoropolymer topcoat. Such a primer composition is described in U.S. application Ser. No. 588,005, filed June 18, 1975. The composition described there comprises a. a fluoropolymer,
b. a binder comprising colloidal silica and the amine salt of a polyamide acid,
c. a coalescing agent,
and
d. a liquid carrier.

While cookware primed with such a composition is quite durable, its entire fluoropolymer coating tends to become scratched after extended use.

SUMMARY OF THE INVENTION

It has now been found that the scratch resistance of such a coating is improved if the primer composition contains mica particles, mica particles coated with pigment, or metal flake.

DETAILED DESCRIPTION OF THE INVENTION

The mica particles, coated mica particles and metal flake used in the compositions of the invention can be any of those available commercially. These particles and flakes have an average longest dimension of 10 to 200 microns, preferably 15-50 microns, with no more than 50% of the particles or flakes having longest dimensions of more than about 500 microns. Particle and flake size is measured optically against a standard.

The mica particles coated with pigment preferred for use are those described in U.S. Pat. No. 3,087,827 to Klenke and Stratton, and U.S. Pat. Nos. 3,087,828 and 3,087,829 to Linton. The disclosures of these patents are incorporated into this specification to describe the various coated micas and how they are prepared.

The micas described in these patents are coated with oxides or hydrous oxides of titanium, zirconium, aluminum, zinc, antimony, tin, iron, copper, nickel, cobalt, chromium, or vanadium. Titanium dixoide coated mica is preferred because of its availability. Mixtures of coated micas can also be used.

Representative of the metal flake which can be used are aluminum flake, stainless steel flake, nickel flake and bronze flake. Mixtures of flake can also be used.

The mica, coated mica or metal flake is ordinarily present in a composition of the invention at a concentration of about 0.2-20%, by weight of the total solids, preferably about 2-15%, even more preferably about 5-12%. "Total solids" means the sum of the fluoropolymer, mica, coated mica or metal flake, polyamide acid salt, pigment and colloidal silica content.

The fluoropolymers used in the compositions of the invention are homopolymers and copolymers (meaning the polymer contains two or more different monomer units) of monoethylenically unsaturated hydrocarbon monomers completely substituted with fluorine atoms or completely substituted with a combination of fluorine atoms and chlorine atoms. Included in this group are perfluoroolefin polymers such as PTFE and copolymers of tetrafluoroethylene and hexafluoropropylene in all monomer unit weight ratios, fluorochlorocarbon polymers such as polymonochlorotrifluoroethylene, and the normally solid copolymers of tetrafluoroethylene and perfluoroalkyl vinyl ethers (wherein the alkyl group is of 1-5 carbon atoms). Mixtures of these can also be used. PTFE is preferred for its thermal stability.

The fluoropolymer used is particulate. The particles are preferably small enough to pass through the nozzle of a spray gun without clogging it and are also small enough to give the resulting film integrity.

The fluoropolymer preferably has a number average molecular weight of at least about 20,000, even more preferably at least about 200,000, because such fluoropolymers give harder finishes.

Number average molecular weight of PTFE is measured by the method described by Suwa, Takehisa and Machi in *Journal of Applied Polymer Science*, Volume 17, pp. 3253-3257 (1973).

The number average molecular weight of a tetrafluoroethylene/hexafluoropropylene copolymer is measured by first determining its melt flow rate (MFR) according to ASTM D2116, using the MFR to determine melt viscosity (MV) according to the equation $$MV = \frac{pi \times \text{pressure used (mm)} \times \text{orifice radius (mm)}}{8 \times MFR \times \text{orifice length (mm)}}$$

and then determining molecular weight (MW) according to the equation $$MW = \sqrt[3.4]{\frac{MV}{1.62 \times 10^{-13}}}$$

Number average molecular weight of a fluorochlorocarbon polymer is measured by ASTM D1430.

Although a powder of fluoropolymer can be used and a carrier provided separately, a polymer in the form of an aqueous dispersion is preferred for its stability and because it is most easily obtained in that form.

The fluoropolymer is ordinarily present in the composition at a concentration of about 10-90%, preferably about 60-80%, by weight of the total of fluoropolymer and binder (as will be defined later).

The binder in the compositions of the invention comprise a colloidal silica and the amine salt of a polyamide acid. This binder is ordinarily present in the composition at a concentration of about 10-90%, preferably about 20-40%, by weight of the total of fluoropolymer and binder.

The colloidal silica component of the binder can be any of those which air-dries to form a continuous film when laid down by itself. Such silicas are generally provided in the form of aqueous sols containing about 30-50%, by weight, of colloidal silica.

Illustrative of the colloidal silica sols which can be used are those sold by E. I. du Pont de Nemours and Company as Ludox Hs-40®: Ludox SM-30®
Ludox HS®: Ludox TM®
Ludox LS®: and
Ludox As®: Ludox Am®.

The preferred colloidal silica sol is Ludox AM®. This product is a sodium stabilized colloidal silica having a pH of about 9 at 25° C, and a silica content (calculated at $SiO_2$) of 30%, whose particles are surface modified with aluminum and have a particle diameter of 13-14 millimicrons and a specific surface area of 210-230 square meters per gram.

Mixtures of colloidal silicas can also be used.

The colloidal silica is ordinarily present in the binder at a concentration of about 5-95%, preferably about 10-80%, by weight of the binder.

The polyamide acid salt component of the binder can be any of those described in copending application Ser. No. 546,998, filed on Feb. 4, 1975, by Thomas P. Concannon. The portions of that application which describe these polyamide acid salts and how they are made are incorporated into this application.

Generally speaking, the polyamide acid salts used in the compositions of the invention are those of polyamide acids with tertiary amines.

The polyamide acids can be represented by the structure

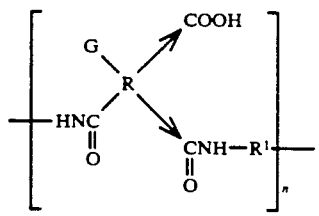

where
G is hydrogen or a carboxyl group;
→ denotes isomerism;
R is a tetravalent organic radical containing at least two carbon atoms, no more than two carbonyl groups of each polyamide acid unit being attached to any one carbon atom of said tetravalent radical;
$R_1$ is a divalent radical containing at least two carbon atoms, the amide groups of adjacent polyamide acid units each being attached to separate atoms of said divalent radical;
and
n is a number large enough to give the polyamide acid an inherent viscosity of at least 0.1, measured as a 0.5% solution in N,N-dimethylacetamide at 30° C.

These polyamide acids are neutralized with stoichiometric amounts of tertiary amines to give the amine salts.

The amine salts of polyamide acids preferred for use in the binder component are those prepared from at least one amine represented by the structure $$H_2N - R_1 - NH_2$$

and at least one acid anhydride represented by the structure

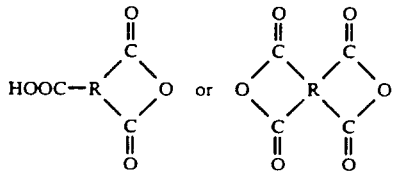

where, in both structures, R and $R_1$ are as previously defined, neutralized with a stoichiometric amount of a tertiary amine.

The amine salts of polyamide acids especially preferred for use in the binder component are those prepared from 1. meta- or para-phenylenediamines, bis(4-aminophenyl)ether, benzidine, 2,2-bis(4'-aminophenyl) propane, bis (4-aminophenyl)methane, bis(4-aminophenyl)sulfone, bis(4-aminophenyl)sulfide or 1,6-hexamethylenediamine;
and
2. pyromellitic dianhydride, trimellitic anhydride, 2,2-bis(3',4'-dicarboxyphenyl)propane dianhydride, or bis(3,4-dicarboxyphenyl)ether dianhydride, neutralized with a stoichiometric amount of trimethylamine, triethylamine, dimethylethanolamine, diethyl 2-hydroxyethylamine, tributylamine, tris(2-hydroxyethyl)amine, ethyl bis(2-hydroxyethyl)amine, N,N-dimethylaniline, morpholine, pyridine, N-methyl pyrrole, or mixtures of these.

The polyamide acid salt most preferred for use in the binder component is one prepared from (bis(4-aminophenyl)methane and trimellitic anhydride, neutralized with a stoichiometric amount of a 2/1 weight ratio mixture of triethylamine and diethyl 2-hydroxyethylamine.

The amine salt is ordinarily present in the binder at a concentration of about 5-95%, preferably about 20-90%, by weight of the binder.

The coalescing agent used in the composition of the invention is, generally speaking, an organic liquid which can dissolve the polyamide acid amine salt used. Organic liquids of this type are highly polar and having boiling points above 100° C. Illustrative are N-methylpyrrolidone
dimethylformamide
dimethylacetamide
dimethylsulfoxide
cresylic acid
sulfolane
and
formamide.

The coalescing agent preferred for use because of its availability and low toxicity is N-methylpyrrolidone.

The coalescing agent is ordinarily present in the compositions of the invention at a concentration of about 10-90% by weight of the polyamide acid amine salt used, preferably about 20-50%.

The compositions of the invention will have more workable viscosities at higher solids content if they contain about 15-200%, preferably about 80-150%, by weight of the polyamide acid amine salt used, of a viscosity reducing agent which is an organic liquid whose solubility parameter, $\delta_T$, falls within the range of 10-21.6, and which is miscible with water. A definition of solubility parameter appears in Kirk-Othmer, "Encyclopedia of Chemical Technology", second edition (1963), pages 889-896.

Total solubility parameter, $\delta_T$, has the following component parameters:

Dispersion component, $\delta D$: 7.0-10.0
Polar component, $\delta P$: 2.0-11.0
Hydrogen bonding component, $\delta H$: 7.0-14.0.

where the equation $$\delta T^2 = \delta D^2 + \delta P^2 + \delta H^2$$

describes the relationship of the components to the total solubility parameter.

Illustrative of such viscosity reducing agents are furfuryl alcohol, 1-butanol, 2-propanol, ethylene glycol monoethyl ether, triethylene glycol, formic acid, and mixtures of these. Furfuryl alcohol is preferred for its effectiveness.

The compositions of the invention can also contain such conventional additives as pigments, flow control agents, surfactants and plasticizers as are necessary or seem desirable. These additives are added for the usual reasons, in the usual ways and in the usual amounts.

The carrier used in the compositions of the invention can be any of those normally used in compositions of this type. It is an inert, not a reactive or functional (in the sense of contributing to the working of the invention) component and its nature is therefore of secondary importance. The carrier serves only to keep the composition homogeneous and acts as a mechanism for conveying the solid components to the substrate. After a coating has been deposited, the carrier evaporates. It is necessary, therefore, only that it be compatible with the other components of the composition and that it have no adverse effects on the coating itself.

Commonly, the fluoropolymer used in the composition is provided in the form of an aqueous dispersion, and the water was introduced into the composition with the polymer also serves as all or as part of the carrier for the composition. Organic liquids such as alcohols, ketones, aliphatic and aromatic hydrocarbons, or mixtures of these, can also be used.

The amount of total solids in the coating composition will be governed by the substrate to which the compositions are to be applied, the method of application, the curing procedures, and like factors. In the usual case, the composition will contain about 10-80%, by weight, of solids.

The compositions can be made by simply mixing together appropriate amounts of the proper components. Pigments can be added, if this is desired, by first conventionally preparing a suitable pigment dispersion and then adding this dispersion to the composition.

The resulting compositions can be applied by spraying, brushing, roller-coating, dipping, or by electrodeposition. The substrate is preferably pretreated by grit blasting, by the flame spraying of metals or metal oxides, or by fritcoating, although the compositions can also be applied to phosphated and chromated metals.

A composition of the invention is ordinarily applied to a thickness of about 2-15 microns (dry) and is then air-dried. This primer coat is then topcoated with a conventional clear or pigmented fluoropolymer enamel and baked in the usual way to give an adherent fluoropolymer coating.

Although the best coating is obtained with the two-coat system just described, a strongly adherent fluoropolymer coating can be obtained with a one-coat operation. To do this, a coat of a composition of the invention is applied to a thickness of 5-50 microns (dry). This coat is then air-dried and baked at a temperature high enough to fuse the fluoropolymer used.

The compositions of the invention are most useful for priming metal cookware, especially frypans, before coating them with PTFE, but the compositions can also be used to prime other articles requiring tightly bonded fluoropolymer coatings. These other articles can be made of glass or any other material capable of withstanding the baking temperatures used. For example, the compositions can be used to prime or coat bearings, valves, wire, metal foil, boilers, pipes, ship bottoms, oven liners, iron soleplates, waffle irons, ice cube trays, snow shovels and plows, chutes, conveyors, dies, tools such as saws, files and drills, hoppers and other industrial containers and molds.

The following examples illustrate the invention. In these examples, all parts and percentages are by weight unless indicated otherwise.

EXAMPLE 1

A. A polyamide acid amine salt solution was prepared by first charging a vessel with

| | |
|---|---|
| Polyamide acid (prepared from trimellitic anhydride and bis(4-aminophenyl)methane, having an inherent viscosity of 0.31, measured as a 0.5% solution in dimethylacetamide, and a free acid content of 7.65% | 15 parts |
| Water | 50 parts |
| Diethyl 2-hydroxyethylamine | 4 parts |
| Triethylamine | 2 parts |
| Furfuryl alcohol | 18 parts |
| N-methyl pyrrolidone | 10 parts | and then stirring the mixture overnight at room temperature.

The resulting clear solution had a Brookfield viscosity (number 2 spindle, 20 revolutions per minute) of 600 centipoises.

B. The following were then added to a vessel in the order given and mixed:

| | | | |
|---|---|---|---|
| (1) | The solution of (A) | | 31.98 parts |
| (2) | Furfuryl alcohol | | 3.21 parts |
| (3) | Deionized water | | 109.47 parts |
| (4) | Pigment dispersion Made by ball-milling a mixture of | | 27.39 parts |
| | Cobalt oxide | 45 parts | |
| | Water | 55 parts | |
| (5) | TiO$_2$ coated mica (Afflair® NF-152-D sold by E.I. du Pont de Nemours and Company) | | 7.6 parts |

Component (5) was added with vigorous mixing. After the addition was complete, the product was stirred for 10 minutes. To it were then added, with mixing

| | | |
|---|---|---|
| (6) | PTFE dispersion (60% solids in water, Teflon® TFE-Fluorocarbon | 91.17 parts |

-continued

| | Resin, Aqueous Dispersion, T-30, sold by E.I. du Pont de Nemours and Company) | |
|---|---|---|
| (7) | Ludox AM® | 36.78 parts |

The resulting primer composition was sprayed on a degreased aluminum panel to a thickness of about 8 microns (dry) and air-dried.

C. A topcoat composition was prepared by adding the following to a vessel in the order given, with mixing:

| (1) | The PTFE dispersion of (B) (6) | | 179.7 parts |
|---|---|---|---|
| (2) | Deionized water | | 2.7 parts |
| (3) | TiO₂ coated mica of (B) (5) | | 9.5 parts |
| (4) | Pigment dispersion of (B) (4) | | 3.5 parts |
| (5) | Mixture of | | |
| | Toluene | 11.24 parts | |
| | Triethanolamine | 14.78 parts | |
| | Butyl carbitol | 4.27 parts | |
| | Oleic acid | 4.72 parts | |
| | Cerium octoate solution (12% in 2-ethylhexanoic acid) | 2.88 parts | |
| | "Triton X-100" (non-ionic surfactant sold by Rohm & Haas Co.) | 1.61 parts | |
| (6) | Methyl methacrylate/ ethyl acrylate/methacrylic acid 39/57/4 terpolymer dispersion (40% in water) | | 33.4 parts |

The resulting topcoat composition was sprayed to a thickness of about 20 microns on the panel primed in (B). The panel was then baked for 5 minutes at 425° C.

The resulting finish showed significantly better scratch resistance than the same one lacking the coated mica component.

EXAMPLE 2

A. The following were added to a vessel in the oder given and mixed:

| (1) | The polyamide acid amine salt solution of Example 1 (A) | 124.57 parts |
|---|---|---|
| (2) | Furfuryl alcohol | 12.52 parts |
| (3) | Deionized water | 280.28 parts |
| (4) | PTFE dispersion of Example 1 (B) (6) | 354.92 parts |
| (5) | Ludox AM® | 143.29 parts |
| (6) | Pigment dispersion of Example 1 (B)(4) | 106.68 parts |
| (7) | TiO₂ coated mica ("Afflair" NF-152-D, sold by E.I. du Pont de Nemours and Company) | 0.74 part |

B. The composition of (A) was applied to an aluminum panel and topcoated as in Example 1, with substantially the same result.

I claim:

1. A coating composition comprising
   a. about 10%–90%, by weight of the total of (a) and (b) solids, of a particulate polymer of monoethylenically unsaturated hydrocarbon monomers completely substituted with fluorine atoms or a combination of fluorine atoms and chlorine atoms, the polymer having a number average molecular weight of at least 20,000;
   b. about 10%–90%, by weight of the total of (a) and (b) solids, of a binder which comprises
      1. about 5%–95%, by weight of the total of (1) and (2), of a colloidal silica which air-dries to form a continuous film when laid down by itself, and
      2. about 5%–95%, by weight of the total of (1) and (2), of a salt of a polyamide acid represented by the structure

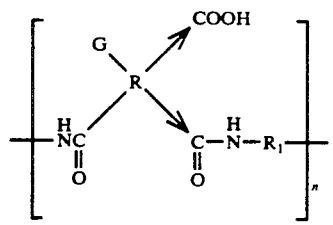

where
   G is a hydrogen or a carboxyl group; → denotes isomerism;
   R is a tetravalent organic radical containing at least two carbon atoms, no more than two carbonyl groups of each polyamide acid unit being attached to any carbon atom of said tetravalent radical;
   $R_1$ is a divalent radical containing at least two carbon atoms, the amide groups of adjacent polyamide acid units each being attached to separate atoms of said divalent radical;
and
   n is a number large enough to give the polyamide acid an inherent viscosity of at least 0.1, measured as a 0.5% solution in N,N-dimethylacetamide at 30° C,
   neutralized with a stoichiometric amount of a tertiary amine;
   c. about 10–90%, by weight of (b) (2), of N-methyl pyrrolidone, dimethylformamide, dimethylacetamide, dimethylsulfoxide, cresylic acid, sulfolane or formamide;
   d. about 0.2–20%, by weight of the total of (a), (b) (1), (b) (2), (c), and (d), of mica particles, mica particles coated with pigment, or metal flake;
and
   e. a liquid carrier.

2. The composition of claim 1 additionally containing about 15–200% of an organic liquid, miscible with water, having a solubility parameter of about 10–21.6, the parameter having a dispersion component of about 7–10, a polar component of about 2–11 and a hydrogen bonding component of about 7–14, where the equation $\delta T^2 = \delta D^2 + \delta P^2 + \delta H^2$ describes the relationship of the components to the total solubility parameter.

3. The composition of claim 2 wherein the organic liquid is furfuryl alcohol, 1-butanol, 2-propanol, ethylene glycol monomethyl ether, triethylene glycol, formic acid, or a mixture of these.

4. The composition of claim 1 wherein the colloidal silica is a sodium stabilized colloidal silica.

5. The composition of claim 1 wherein the salt of the polyamide acid in (b)(2) is one prepared from at least one amine represented by the structure

and at least one acid anhydride represented by the structure

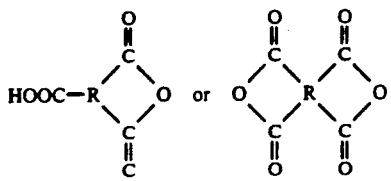

where, in both structures, R and $R_1$ are as defined in claim 1.

6. The composition of claim 5 wherein the salt of a polyamide acid is one prepared from
   a. meta- or para-phenylenediamine, bis(4-aminophenyl)ether, benzidine, 2,2-bis(4'-aminophenyl)propane, bis(4-aminophenyl)methane, bis(4-aminophenyl)sulfone, bis(4-aminophenyl)sulfide or 1,6-hexamethylene diamine,
   and
   b. pyromellitic dianhydride, trimellitic anhydride, 2,2-bis(3',4'-dicarboxyphenyl)propane dianhydride or bis(3,4-dicarboxyphenyl)ether dianhydride.

7. The composition of claim 1 wherein the fluorocarbon polymer is PTFE.

8. The composition of claim 1 wherein the carrier is water.

9. The composition of claim 1 wherein the (d) component is mica particles coated with $TiO_2$.

10. The composition of claim 1 comprising
    a. PTFE;
    b. a sodium stabilized colloidal silica;
    c. the salt of a polyamide acid prepared from trimellitic anhydride and bis(4-aminophenyl)methane, neutralized with a 2/1 weight ratio mixture of triethylamine and diethyl 2-hydroxyethylamine;
    d. N-methyl pyrrolidone;
    e. mica coated with $TiO_2$;
    and
    f. water as a carrier.

11. The composition of claim 8 additionally containing about 15-200%, of furfuryl alcohol.

12. An article bearing a primer coat of the composition of claim 1 and a topcoat of a fused fluoropolymer enamel.

13. An article bearing a primer coat of the composition of claim 2 and a topcoat of a fused fluoropolymer enamel.

14. An article bearing a primer coat of the composition of claim 3 and a topcoat of a fused fluoropolymer enamel.

15. An article bearing a primer coat of the composition of claim 4 and a topcoat of a fused fluoropolymer enamel.

16. An article bearing a primer coat of the composition of claim 5 and a topcoat of a fused fluoropolymer enamel.

17. An article bearing a primer coat of the composition of claim 6 and a topcoat of a fused fluoropolymer enamel.

18. An article bearing a primer coat of the composition of claim 7 and a topcoat of a fused fluoropolymer enamel.

19. An article bearing a primer coat of the composition of claim 8 and a topcoat of a fused fluoropolymer enamel.

20. An article bearing a primer coat of the composition of claim 9 and a topcoat of a fused fluoropolymer enamel.

21. An article bearing a primer coat of the composition of claim 10 and a topcoat of a fused fluoropolymer enamel.

22. An article bearing a primer coating of the composition of claim 11 and a topcoat of a fused fluoropolymer enamel.

23. In a method for improving the adhesion of a fluoropolymer coating to its substrate, the improvement comprising priming the substrate, before the fluoropolymer coating is applied, with a composition according to claim 1.

* * * * *